2,868,624

STABILIZATION OF SULFUR TRIOXIDE

Kenneth J. Shaver, Stoneham, and Randolph Perry, Jr., Arlington, Mass., assignors to Monsanto Chemical Company, St. Louis, Mo., a corporation of Delaware No Drawing. Application July 8, 1957
Serial No. 670,378

10 Claims. (Cl. 23—174)

This invention relates to the stabilization of liquid sulfur trioxide and high strength oleums.

Sulfur trioxide is known to exist in three different modifications—namely, a γ-modification melting at about 16.8° C., a β-modification melting at about 32.5° C., and an α-modification melting at about 62.3° C. Upon standing at temperatures below about 27° C., especially in the presence of even very small amounts of moisture, the low-melting γ-modification rapidly polymerizes to one or both of the higher-melting β- or α-modifications. Since sulfur trioxide is much more readily handled and used in the liquid γ-modification, it is an object of this invention to provide novel stabilizing compounds which, when incorporated into sulfur trioxide, will substantially retard or eliminate the conversion of γ-sulfur trioxide to either of the higher melting β- or α-sulfur trioxides—even in the presence of substantial quantities of moisture.

We have now found that the foregoing formation of higher-melting modifications of sulfur trioxide can be minimized, and the lower-melting γ-modification effectively stabilized, by the presence of minor amounts up to about 5 weight percent of sulfonic acids and their ester, acid halide, and amide derivatives.

In general, the simple hydrocarbon sulfonic acids and derivatives are preferred, such as the alkanesulfonic acids (e. g., methanesulfonic acid, ethanesulfonic acid, n-propanesulfonic acid, i-propanesulfonic acid, n-butanesulfonic acid, t-butanesulfonic acid, neopentanesulfonic acid, n-octanesulfonic acid, 2-ethylhexane sulfonic acid, n-decanesulfonic acid, n-dodecanesulfonic acid, tridecanesulfonic acid, etc.); arenesulfonic acids (e. g., benzenesulfonic acids, α- and β-naphthalenesulfonic acids, anthracenesulfonic acids, etc.); alkylarenesulfonic acids (e. g., ortho-, meta-, and para-toluenesulfonic acids, the various xylenesulfonic acids such as 2,5-dimethylbenzenesulfonic acid, 2,4-dimethyl-6-t-butylbenzenesulfonic acid) etc.; cycloalkanesulfonic acids (e. g., cyclopentanesulfonic acid, cyclohexanesulfonic acid, 2,5-endomethylenecyclohexanesulfonic acid, etc.); as well as the aforementioned ester, acid halide, and amide derivatives of said acids.

Typical examples of suitable ester derivatives of sulfonic acids are the alkyl (especially lower alkyl), aryl, alkaryl, cycloalkyl, etc. esters, such as methyl, ethyl, isopropyl, normal and secondary butyl, normal and tertiary pentyl, 2-ethylhexyl and higher alkyl esters; phenyl, α- and β-naphthyl and similar aryl esters; various tolyl, xylyl and higher alkylated aromatic esters; and numerous other typical hydrocarbyl esters of the present sulfonic acids.

The preferred acid halide derivatives of sulfonic acids are the sulfonyl chlorides.

The amide derivatives of the aforementioned sulfonic acids can be either simple sulfonamides (i. e., —$SO_2NH_2$), or primary or secondary sulfonamides (i. e., —$SO_2NHR$ or —$SO_2NR_2$). The N-substituents can be either hydrocarbyl substituents (such as those mentioned above in connection with the ester derivatives) or they can be polar substituents such as polar substituted hydrocarbon groups or acyl radicals. Particularly preferred acyl radicals are carbonyl groups (such as acetyl, etc.), sulfonyl or hydrocarbon-sulfonyl (particularly alkylsulfonyl) groups, and numerous others which will be readily apparent to ordinarily skilled chemists.

Particularly preferred categories of the foregoing sulfonic acids and derivatives thereof are the lower (i. e., $C_1$ and $C_2$) alkanesulfonic acids and their derivatives—especially the lower alkanesulfonyl chlorides and alkanesulfonamides. Examples of outstandingly effective stabilizers within the latter categories are methanesulfonyl chloride and N-(methylsulfonyl)methanesulfonamide—also known as bis(methylsulfonyl)imide.

It will be noted that the predominant proportion of the above-described and enumerated sulfonic acids and derivatives are the simple unsubstituted hydrocarbyl species containing the essential active R—$SO_2$— group therein. It should be understood, however, that the presence of additional non-hydrocarbyl groups (such as in β-chloroethanesulfonic acid) is not precluded—provided, of course, that the compound be kept free of groups which will react adversely with the sulfur trioxide or with the sulfonyl groups of the present stabilizers, thereby destroying the essential sulfur trioxide stabilizing activity thereof. Examples of typical non-interfering groups which may be present are sulfate, sulfite, nitro and halogen groups.

Also permissible are additional sulfonic acid groups and derivatives thereof such as discussed above. Thus, the present invention includes the use of di- and trisulfonic acids and corresponding ester, acid chloride, and amide derivatives thereof, such as toluenedisulfonic acids, naphthalenedisulfonyl chloride, methanedisulfonamide, methanetrisulfonic acid, etc.

As indicated earlier, the present class of sulfur trioxide stabilizers is effective in minor concentrations less than about 5 weight percent of the sulfur trioxide. The proper concentration to be used under any particular circumstances will depend upon the particular stabilizer selected, the degree of stability desired, and the amount of moisture present (or likely to become present) in the sulfur trioxide, but in general an adequate concentration will fall between about 0.1 weight percent and about 2 weight percent of the sulfur trioxide.

Further details of the invention will be apparent from the following examples, which completely describe and illustrate the effectiveness of various specific embodiments of the invention.

EXAMPLE 1

Sealed vials of $SO_3$ containing known concentrations of $H_2O$ (added as sulfuric acid) and various stabilizers were allowed to stand overnight at room temperature and were then placed in a water bath maintained at 20.0±0.5° C. After the vials and their contents had come to 20° C., the tip of each vial was dipped in a dry ice-acetone mixture for a few seconds to provide a seed crystal of solid $SO_3$. Each vial was then returned to the 20° C. water bath and the contents thereof observed for growth or disappearance of the seed crystal. If the stabilizer was ineffective, the entire contents of the vial would solidify rapidly. For example, sulfur trioxide containing as little as 0.2 weight percent of moisture (and no stabilizer) became completely solid in about one hour. In efficiently stabilized sulfur trioxide the seed crystal remelted at 20° C. In some cases of particularly good stabilizers, it was unusually difficult or even impossible to obtain any permanent seed crystal at all. The results of the above-described tests are presented in Table I.

Table I

| Stabilizer | | H₂O Conc., Wt. Percent | Results |
|---|---|---|---|
| Compound | Conc., Wt. Percent | | |
| Methanesulfonic acid | 1.24 | 0.15 | Seed crystal remelted. |
| Benzenesulfonic acid | 0.62 | 0.15 | Could not obtain permanent seed crystals; slight cloudiness developed after multiple attemps to seed. |
| Methylbenzenesulfonate | 0.96 | 0.12 | Seed crystal remelted. |
| Benzenesulfonyl chloride | 0.46 | 0.13 | Do. |
| Methanesulfonyl chloride | 1.0 | 0.20 | Do. |
| N-(methylsulfonyl) methanesulfonamide | 0.52 | 0.06 | Do. |

EXAMPLE 2

A more rigorous evaluation was carried out in the following manner. Vials of sulfur trioxide, water and various stabilizers were prepared as in Example 1, allowed to stand at room temperature for about 16 hours and then cooled to 0° C. and held for about 16 hours. The vials were then allowed to stand at room temperature for about 8 hours, after which time the percent solid sulfur trioxide remaining in the vial was noted. Unstabilized sulfur trioxide containing as little as 0.005 weight percent of moisture remained completely solid after the foregoing treatment. The effectiveness of various stabilizers evaluated by the foregoing tests is listed in Table II.

Table II

| Stabilizer | | H₂O Conc., Wt. Percent | Percent Solids |
|---|---|---|---|
| Compound | Conc., Wt. Percent | | |
| Methanesulfonic acid | 1.36 | 0.026 | 4 |
| Methyl methanesulfonate | 0.61 | 0.006 | Trace (<1%) |
| Methyl benzenesulfonate | 0.68 | 0.057 | 0 |
| Benzenesulfonyl chloride | 0.67 | 0.010 | 8 |
| Benzenesulfonamide | 0.62 | 0.006 | 10 |
| p-Toluenesulfonamide | 0.64 | 0.005 | 10 |
| p-Toluenesulfonyl chloride | 0.77 | 0.011 | 15 |
| 2,5-Dimethylbenzenesulfonyl chloride | 0.83 | 0.010 | 2 |
| Ethanesulfonyl chloride | 0.55 | 0.007 | 10 |
| Methanesulfonyl chloride | 0.90 | 0.027 | 0 |
| N-(methylsulfonyl)methanesulfonamide | 0.50 | 0.020 | 0 |

The lower alkanesulfonic acids (i. e., methane- and ethane-sulfonic acids) and the amide, acid chloride and alkyl ester (especially methyl and ethyl esters) derivatives of those sulfonic acids are particularly outstanding stabilizers for γ-sulfur trioxide. This was demonstrated by taking the last two samples itemized in Table II, above, and subjecting them to repeated freeze-thaw cycles in the same manner described in Example 2. Even after four such cycles, the composition stabilized with N-(methylsulfonyl)methanesulfonamide contained only 1 percent of solids. After eight cycles, the composition stabilized with methanesulfonyl chloride contained only a fraction of 1 percent (less than 0.1 weight percent) solid sulfur trioxide.

Some of the stabilizers of this invention, particularly those containing hydrocarbon groups larger than methyl or ethyl, tend to impart varying degrees of discoloration to sulfur trioxide when added thereto. This discoloration does not appear to have any adverse effect upon the stabilized nature or chemical properties of the sulfur trioxide. However, where the absence of discoloration is a practical factor, the methyl and ethyl derivatives of the present sulfonic acids are the preferred materials.

We claim:

1. A composition of matter comprising liquid sulfur trioxide having had added thereto a minor amount less than about 5 weight percent of a compound selected from the class consisting of sulfonic acids and the ester, amide, and acid halide derivatives thereof.

2. The composition of matter comprising liquid sulfur trioxide having had added thereto between about 0.1 and about 2 weight percent of a compound selected from the class consisting of sulfonic acids and the ester, amide, and acid halide derivatives thereof.

3. A composition of matter comprising liquid sulfur trioxide having had added thereto between about 0.1 and about 2 weight percent of a lower alkanesulfonic acid chloride.

4. A composition of matter comprising liquid sulfur trioxide having had added thereto between about 0.1 and about 2 weight percent of methanesulfonyl chloride.

5. The composition of matter comprising liquid sulfur trioxide having had added thereto between about 0.1 and about 2 weight percent of a lower alkanesulfonic acid amide.

6. A composition of matter comprising liquid sulfur trioxide having had added thereto between about 0.1 and about 2 weight percent of N-(methylsulfonyl)methanesulfonamide.

7. The composition of matter comprising liquid sulfur trioxide having had added thereto between about 0.1 and about 2 weight percent of an alkanesulfonic acid.

8. The composition of matter comprising liquid sulfur trioxide having had added thereto between about 0.1 and about 2 weight percent of an ester of an alkanesulfonic acid.

9. The composition of matter comprising liquid sulfur trioxide having had added thereto between about 0.1 and about 2 weight percent of an amide of an alkanesulfonic acid.

10. The composition of matter comprising liquid sulfur trioxide having had added thereto between about 0.1 and about 2 weight percent of an alkanesulfonic acid halide.

References Cited in the file of this patent

UNITED STATES PATENTS 2,807,641    Milner et al.    Sept. 24, 1957